US011904639B2

(12) United States Patent
Sato

(10) Patent No.: US 11,904,639 B2
(45) Date of Patent: Feb. 20, 2024

(54) TIRE

(71) Applicant: Sumitomo Rubber Industries, Ltd., Kobe (JP)

(72) Inventor: Yohei Sato, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 364 days.

(21) Appl. No.: 17/232,578

(22) Filed: Apr. 16, 2021

(65) Prior Publication Data

US 2021/0339573 A1 Nov. 4, 2021

(30) Foreign Application Priority Data

May 1, 2020 (JP) .................. 2020-081400

(51) Int. Cl.
*B60C 11/13* (2006.01)
*B60C 11/03* (2006.01)

(52) U.S. Cl.
CPC ...... *B60C 11/1384* (2013.01); *B60C 11/0302* (2013.01); *B60C 11/0309* (2013.01); *B60C 11/1392* (2013.01); *B60C 2011/0365* (2013.01)

(58) Field of Classification Search
CPC ............. B60C 11/1315; B60C 11/1376; B60C 11/1384; B60C 11/1392
See application file for complete search history.

(56) References Cited

U.S. PATENT DOCUMENTS

2011/0056601 A1\* 3/2011 Ebiko ................. B60C 15/0018
152/209.16
2016/0101655 A1\* 4/2016 Shibayama ......... B60C 11/1323
152/209.18

FOREIGN PATENT DOCUMENTS

| EP | 2918427 A2 | \* | 9/2015 | ......... B60C 11/0304 |
| JP | 05254311 A | \* | 10/1993 | |
| JP | 2002-36824 A | | 2/2002 | |
| JP | 2002036826 A | \* | 2/2002 | ......... B60C 11/1384 |
| JP | 2002046424 A | \* | 2/2002 | ......... B60C 11/0304 |

OTHER PUBLICATIONS

English machine translation of JP-05254311-A (Year: 1993).\*
English machine translation of JP-2002036826-A (Year: 2002).\*
English machine translation of JP-2002046424-A (Year: 2002).\*

\* cited by examiner

*Primary Examiner* — Robert C Dye
(74) *Attorney, Agent, or Firm* — Birch, Stewart, Kolasch & Birch, LLP

(57) ABSTRACT

A tire includes a tread portion including a row of blocks arranged in a tire circumferential direction divided by lateral grooves. Each block includes a block tread surface, a first block sidewall surface located on a leading side in a rotation direction of the block, and a leading-side corner portion between the block tread surface and the first block sidewall surface. The leading-side corner portion includes a first portion and a second portion extending in a tire axial direction. The first portion is formed sharper than the second portion. In a plan view of each block, an angle θ1 of the first portion to the tire circumferential direction is larger than an angle θ2 of the second portion to the tire circumferential direction. Each lateral groove has a groove width (A) at the first portion that is larger than a groove width (B) at the second portion.

15 Claims, 10 Drawing Sheets

TIRE

RELATED APPLICATION

This application claims the benefit of foreign priority to Japanese Patent Application No. JP2020-081400, filed May 1, 2020, which is incorporated by reference in its entirety.

BACKGROUND ART

Field of the Invention

The present invention relates to a tire.

Description of the Related Art

The following Patent Document 1 discloses a pneumatic tire including a plurality of blocks on the tread portion. The blocks include block edges which are chamfered. The pneumatic tire is expected the effect that the contact pressure of the blocks is made uniform.

Patent Document

[Patent Document 1] Japanese Unexamined Patent Application Publication 2002-36824

SUMMARY OF THE INVENTION

Unfortunately, in Patent Document 1, steering stability performance on wet road surfaces (hereinafter, may be simply referred to as "wet steering stability performance") has not been examined.

The present invention has been made in view of the above circumstance and has a major object to provide a tire capable of improving wet steering stability performance.

In one aspect of the invention, a tire includes a tread portion having a designated rotation direction, the tread portion including at least one block row including a plurality of blocks arranged in a tire circumferential direction and a plurality of lateral grooves arranged between the plurality of blocks, each of the plurality of blocks including a block tread surface, a first block sidewall surface located on a leading side in the rotation direction of the block, and a leading-side corner portion between the block tread surface and the first block sidewall surface, wherein the leading-side corner portion includes a first portion and a second portion each extending in a tire axial direction, the first portion is smaller in angle ($\gamma$) than the second portion, where the angle ($\gamma$) is an angle between a normal (n) of the block tread surface and a virtual straight-line (m) in which the block sidewall surface connected to the block tread surface is expanded outwardly in a tire radial direction, in a plan view of each block, an angle $\theta 1$ of the first portion with respect to the tire circumferential direction is larger than an angle $\theta 2$ of the second portion with respect to the tire circumferential direction, and each lateral groove has a groove width (A) at the first portion that is larger than a groove width (B) at the second portion.

In another aspect of the present invention, a chamfer portion may be formed on the second portion, and no chamfer portion may be formed on the first portion.

In another aspect of the present invention, a chamfer portion may be formed on the second portion, a chamfer portion may be formed on the first portion, and the chamfer portion of the first portion may be smaller in chamfer width and chamfer height than the chamfer portion of the second portion.

In another aspect of the present invention, the angle $\theta 1$ of the first portion with respect to the tire circumferential direction may be equal to or more than 45 degrees.

In another aspect of the present invention, the angle $\theta 1$ of the first portion with respect to the tire circumferential direction may be equal to or more than 70 degrees.

In another aspect of the present invention, a ratio (B/A) of the groove width (B) at the second portion to the groove width (A) at the first portion may be in a range of 0.50 to 0.95.

In another aspect of the present invention, a chamfer portion may be formed on the second portion, and a chamfer width, which is a length of the chamfer portion in the tire circumferential direction, of the second portion may be in a range of 1.0 to 10.0 mm.

In another aspect of the present invention, a chamfer portion may be formed on the second portion, and the chamfer portion of the second portion may be formed by a curved surface that is convex outward in a tire radial direction.

In another aspect of the present invention, a chamfer portion may be formed on the second portion, and the chamfer portion of the second portion may be formed by a plane.

In another aspect of the present invention, the block tread surface may include a periphery portion connected to the first portion, and the periphery portion may be inclined outwardly in a tire radial direction toward the first portion.

In another aspect of the present invention, the plurality of blocks may be a plurality of shoulder blocks that includes a tread edge, and each first portion of the plurality of shoulder blocks may be arranged on the tread edge side with respect to a respective one of the second portions of the plurality of shoulder blocks.

In another aspect of the present invention, each of the plurality of blocks may include a second block sidewall surface located on a trailing side in the rotation direction of the block, and a trailing-side corner portion between the block tread surface and the second block sidewall surface, and a chamfer portion may be formed on the trailing-side corner portion.

In another aspect of the present invention, the tread portion may be provided with a main groove extending in the tire circumferential direction, and each second portion may be in communication with the main groove.

In another aspect of the present invention, each of the plurality of blocks may include a longitudinal block sidewall surface formed by the main groove, and a main-groove side corner portion between the block tread surface and the longitudinal block sidewall surface, and a chamfer portion may be formed on the main-groove side corner portion.

In another aspect of the present invention, the tire may further include a belt layer disposed in the tread portion, wherein the belt layer may include an inner belt ply having a plurality of belt cords oriented in a first direction with respect to the tire axial direction, and an outer belt ply disposed outwardly in a tire radial direction of the inner belt ply and having a plurality of belt cords oriented in a second direction opposite the first direction with respect to the tire axial direction, and the belt layer may be located in an inner region of each first portion in the tire radial direction.

DETAILED DESCRIPTION OF EMBODIMENTS

Figure 1:
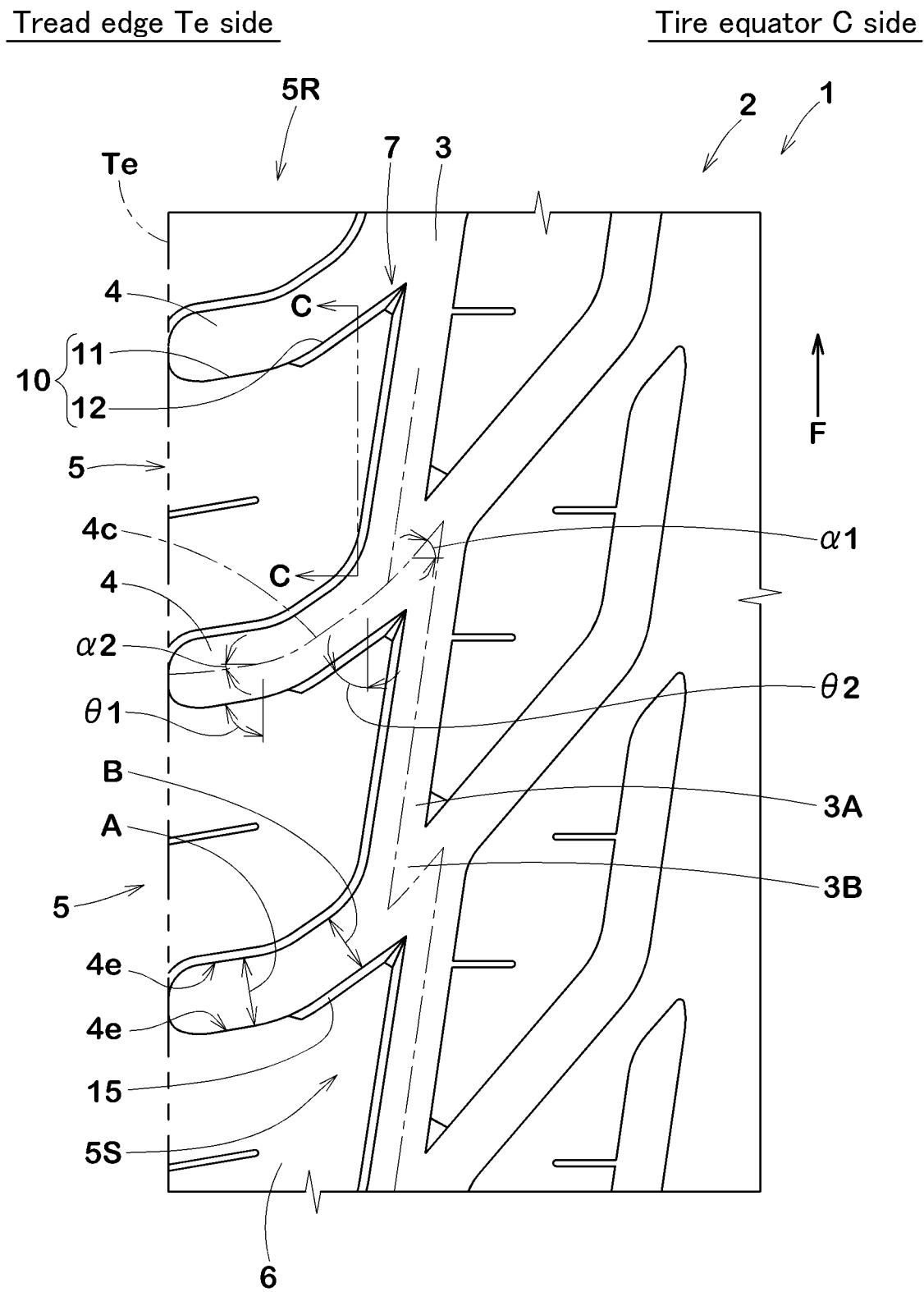
FIG. 1 is a partial plan view of a tread portion in accordance with an embodiment.

One or more embodiments of the present disclosure will be explained below with reference to the accompanying drawings. Note that the same or common elements are denoted by the same reference numerals throughout the specification, and duplicate explanations are omitted.

FIG. 1 illustrates a partial plan view of a tread portion 2 of a tire 1 in accordance with an embodiment of the present invention. The tire 1 according to the present embodiment is embodied as a pneumatic passenger car tire, especially a high-performance tire that can suitably drive on public roads as well as circuits. Note that the present invention, for example, can be applied to pneumatic tires for motorcycle, heavy-duty vehicle and other category vehicles.

As illustrated in FIG. 1, the tire 1 has a directional tread pattern in which a rotation direction F is designated. The rotation direction F, for example, is indicated by letters or symbols on the tire sidewall (not illustrated).

The tread portion 2 includes at least one block row 5R including a plurality of blocks 5 arranged in the tire circumferential direction. The block row 5R further includes a plurality of lateral grooves 4 each of which is located between the adjacent blocks 5.

Each of the plurality of blocks 5 includes a block tread surface 6, a first block sidewall surface 7 located on a leading side in the rotation direction F of the block, and a leading-side corner portion 10 between the block tread surface 6 and the first block sidewall surface 7. Note that the "leading side" of the block means a side of the block that comes into contact with the ground first in the rotation direction F.

The block tread surface 6 is a ground contact surface of each block 5 which comes into contact with a plane when the tire 1 being under a standard condition is grounded on the plane loaded with a standard tire load at zero camber angles.

As used herein, the "standard condition" is such that the tire 1 is mounted onto a standard wheel rim with a standard internal pressure but loaded with no tire load. As used herein, unless otherwise specified, measurements of the portions of the tire are values measured from the tire being under the standard condition.

As used herein, the "standard wheel rim" is a wheel rim officially approved for each tire by standards organizations on which the tire 1 is based, wherein the standard wheel rim is the "standard rim" specified in JATMA, the "Design Rim" in TRA, and the "Measuring Rim" in ETRTO, for example.

As used herein, the "standard internal pressure" is a standard internal pressure officially approved for each tire by standards organizations on which the pneumatic tire 1 is based, wherein the standard internal pressure is the "maximum air pressure" in JATMA, the maximum pressure given in the "tire Load Limits at Various Cold Inflation Pressures" table in TRA, and the "Inflation Pressure" in ETRTO, for example.

As used herein, the "standard tire load" is a tire load officially approved for each tire by standards organizations in which the pneumatic tire 1 is based, wherein the standard tire load is the "maximum load capacity" in JATMA, the maximum value given in the above-mentioned table in TRA, the "Load Capacity" in ETRTO, for example.

Figure 2:
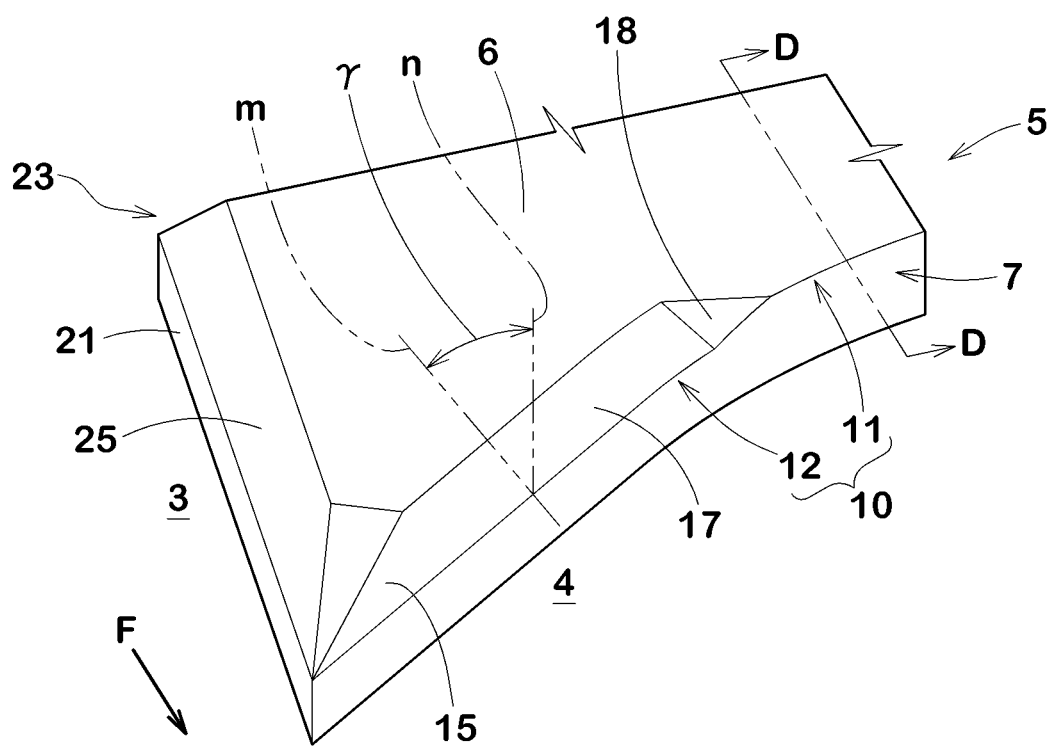
FIG. 2 is a partial perspective view of a block.

FIG. 2 illustrates a partial perspective view of one of the blocks 5 viewed from the first block sidewall surface 7 side thereof. As illustrated in FIG. 2, the leading-side corner portion 10 includes a first portion 11 and a second portion 12 each of which extends in the tire axial direction. The first portion 11 is formed sharper than the second portion 12. Such a first portion 11 can increase the ground contact pressure of the block tread surface 6 on the leading-side corner portion 10 side relatively, preventing the block 5 from lifting on a water layer on the road surface, thus resulting in improving hydro performance of the tire. Further, the second portion 12 can suppress the increase in the ground contact pressure of the block tread surface 6 of the leading-side corner portion 10, thus promoting equalization of the ground contact pressure. As a result, the tire 1 of the present embodiment provides excellent wet steering stability performance. As used herein, the above-mentioned "sharper" is evaluated by an angle $\gamma$ between the normal n of the block tread surface 6 and a virtual straight-line m in which the block sidewall surface 7 connected to the block tread surface 6 is expanded outward in the radial direction of the tire. In the present specification, when one is sharper than another, it means that the angle $\gamma$ of said one is smaller than the angle $\gamma$ of said another. The angle $\gamma$ of the first portion 11 which is sharper than the second portion is preferably equal to or less than 15 degrees, more preferably equal to or less than 10 degrees, still further preferably equal to or less than 5 degrees. In other words, the angle $\gamma$ of the second portion 12 which is not sharper than the first portion 11 is preferably more than 15 degrees, more preferably more than 10 degrees, still further preferably more than 5 degrees. Note that when a chamfer portion 15 which is described later is formed on the leading-side corner portion 10, the sharpness is determined by a minimum angle $\gamma$ (shown in FIG. 3) between the normal n of the block tread surface 6 and the chamfer portion 15.

As illustrated in FIG. 1, an angle $\theta 1$ of the first portion 11 with respect to the tire circumferential direction is larger than an angle $\theta 2$ of the second portion 12 with respect to the tire circumferential direction. Such a first portion 11 can further prevent each block 5 from lifting on a water layer on the road surface. Further, the second portion 12 can smoothly discharge the water layer to the trailing side (tread edge Te side) in the rotation direction F of the lateral grooves 4 utilizing the rotation of the tire 1.

In each lateral groove 4, a groove width A at the first portion 11 is greater than a groove width B at the second portion 12. Thus, water dispersed by the first portion 11 of each block 5 can be drained through each lateral groove 4 at the first portion 11. Also, in each lateral groove 4, the water flow velocity at the first portion 11 during drainage is lower than that at the second portion 12 where the angle θ2 is relatively small. Thus, by increasing the groove width A relative to the groove width B, water dispersed by the first portion 11 of the block 5 can be drained smoothly. As used herein, the groove widths A and B are lengths that are orthogonal to respective groove centerlines 4c, and obtained as weighed average groove widths that take the respective groove lengths into consideration. Note that when a chamfer, which will be described later, has been formed on the first and/or second portions, the groove width A and/or B is measured assuming that no chamfer is formed on the portion.

In the present embodiment, the blocks 5 are sectioned by one of tread edges Te, a main groove 3 extending in the tire circumferential direction, and the lateral grooves 4. Thus, the blocks 5 in accordance with the present embodiment are formed as shoulder blocks 5S forming the tread edge Te. As used herein, the "tread edges" Te are the axial outermost edges of the ground contacting patch of the tire 1 which occurs under a condition such that the tire 1 under the standard condition is grounded on a plane with the standard tire load at zero camber angles. Note that blocks 5 are not limited to the shoulder blocks 5S, but may be formed as middle blocks or crown blocks (not illustrated) arranged on the tire equator C side of the shoulder blocks 5S, for example.

The main groove 3 according to the present embodiment, for example, extends in a lightning shape along the tire circumferential direction. Specifically, the main groove 3 according to the present embodiment includes a plurality of first inclined grove parts 3A inclined in a direction with respect to the tire axial direction, and a plurality of second inclined groove parts 3B inclined in the same direction as the first inclined grove parts 3A and having a smaller angle α1 than that of the first inclined grove parts 3A with respect to the tire axial direction. Note that the main groove 3 is not limited to such an aspect.

The first inclined groove parts 3A and the second inclined groove parts 3B, for example, are inclined toward the tread edge Te to the opposite direction in the rotation direction F. The first inclined groove parts 3A and the second inclined groove parts 3B, in the present embodiment, are alternated in the tire circumferential direction. Each of the second inclined groove parts 3B, for example, is continuous to a respective one of the lateral grooves 4 smoothly so as to form an extended single lateral groove.

The lateral grooves 4 according to the present embodiment extend in the tire axial direction and are spaced in the tire circumferential direction. The lateral grooves 4, for example, connect the main groove 3 with the tread edge Te. The lateral grooves 4 according to the present embodiment are inclined toward the tread edge Te to the opposite direction in the rotation direction F. Such lateral grooves 4, using tire rotation, can drain water smoothly in the main groove 3 to the outside of the tread edge Te.

An angle α2 with respect to the tire axial direction of each lateral groove 4, for example, becomes smaller continuously toward the tread edge Te. Such lateral grooves 4 can further improve wet steering stability performance. Note that the lateral grooves 4 are not limited to such an aspect.

In the present embodiment, groove walls 4e of each lateral groove 4 constitute each first block sidewall surface 7, and each second block sidewall surface 20 which will be described later (shown in FIG. 4).

In the present embodiment, a chamfer portion 15 is formed on the second portion 12. Such a chamfer portion 15 can help to improve the uniformity of the ground contact pressure of the block 5. The chamfer portion 15 is an inclined surface having a shape like being cut off diagonally from the block tread surface 6 to the lateral groove 4 or the main groove 3 side. Further, the chamfered portion 15 is a surface that comes into contact with the ground when the tire 1 being under the standard condition is grounded on the plane loaded with the standard tire load at zero camber angles. Thus, when a chamfer portion is provided, the block tread surface 6 of the brock means a brock tread surface that excludes the chamfer portion. As used herein, note that the chamfer portion does not include a roundness having a radius of curvature r of less than 1 mm that may be formed in manufacturing process of the tire 1. Further, in the present embodiment, no chamfer portion is formed on the first portion 11.

Figure 3:
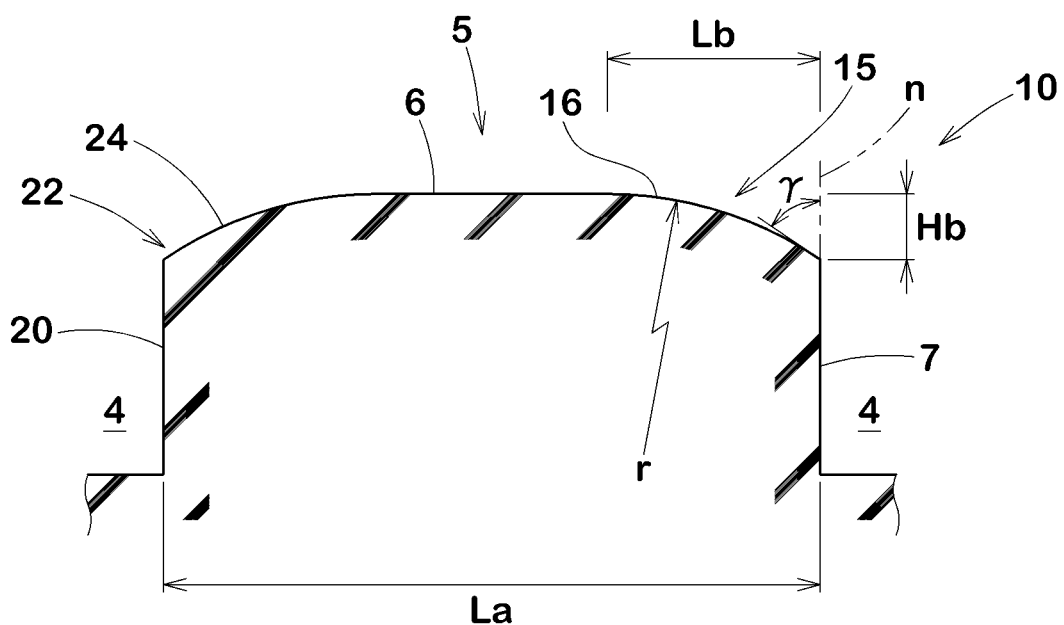
FIG. 3 is a cross-sectional view taken along the line C-C of FIG. 1.

FIG. 3 illustrates a cross-sectional view taken along the line C-C of FIG. 1. As illustrated in FIG. 3, the chamfer portion 15, for example, is formed by a curved surface 16 that is convex outwardly in the tire radial direction. Such a chamfer portion 15 can further make the ground contact pressure on the chamfer portion 15 more uniform. The chamfer portion 15 according to the present embodiment is formed such that a radius of curvature r becomes smaller toward the first block sidewall surface 7. As a result, the ground contact pressure on the side of the first block sidewall surface 7, which tends to receive a larger ground contact pressure, can be reduced, and the ground contact pressure of the block 5 can be uniformed. Thus, wet steering stability performance of the tire can further be improved. The chamfer portion 15, for example, may have the radius of curvature r being continuously smaller toward the first block sidewall surface 7. Alternatively, the chamfer portion 15, for example, may have a radius of curvature r being formed by a single arc.

When a chamfer width Lb, which is a length in the tire circumferential direction of the chamfer portion 15, is equal to or more than 1.0 mm, it is effective for the uniformity of the ground contact pressure. When the chamfer width Lb is equal to or less than 10.0 mm, it is effective in maintaining high rigidity of the block 5. In order to further improve the above effects, the chamfer width Lb is preferably equal to or more than 2.0 mm, more preferably equal to or more than 3.0 mm, but preferably equal to or less than 9.0 mm, more preferably equal to or less than 8.0 mm.

In order to improve uniformity of the ground contact pressure while maintaining rigidity of the block 5 in the tire circumferential direction, the chamfer width Lb of the block 5 is preferably equal to or more than 10% of the length La in the tire circumferential direction of the block 5 (maximum length on the tire circumferential line), more preferably equal to or more than 15%. Further, the chamfer width Lb of the block 5 is preferably equal to or less than 25% of the length La of the block 5, more preferably equal to or less than 20%.

When a chamfer height Hb, which is the height of the chamfer portion 15 in the tire radial direction, is equal to or less than 0.25 times of the chamfer width Lb, the chamfer portion 15 can be effectively grounded, and thus uniformity of the ground contact pressure can be increased, thereby improving wet steering stability performance. When the chamfer height Hb is equal to or more than 0.08 times the chamfer width Lb, the ground contact pressure of the chamfer portion 15 can be reduced, and the uniformity can be improved. In order to further improve the above effects, the chamfer height Hb is more preferably equal to or less than 0.22 times the chamfer width Lb, but preferably equal to or more than 0.10 times.

As illustrated in FIG. 1, the first portion 11 is arranged on the tread edge Te side with respect to the second portion 12. Thus, water which is dispersed by effects of the first portion 11 so as not to enter under the block tread surface 6 can be drained smoothly to the tread edge Te through the lateral groove 4.

Figure 4:
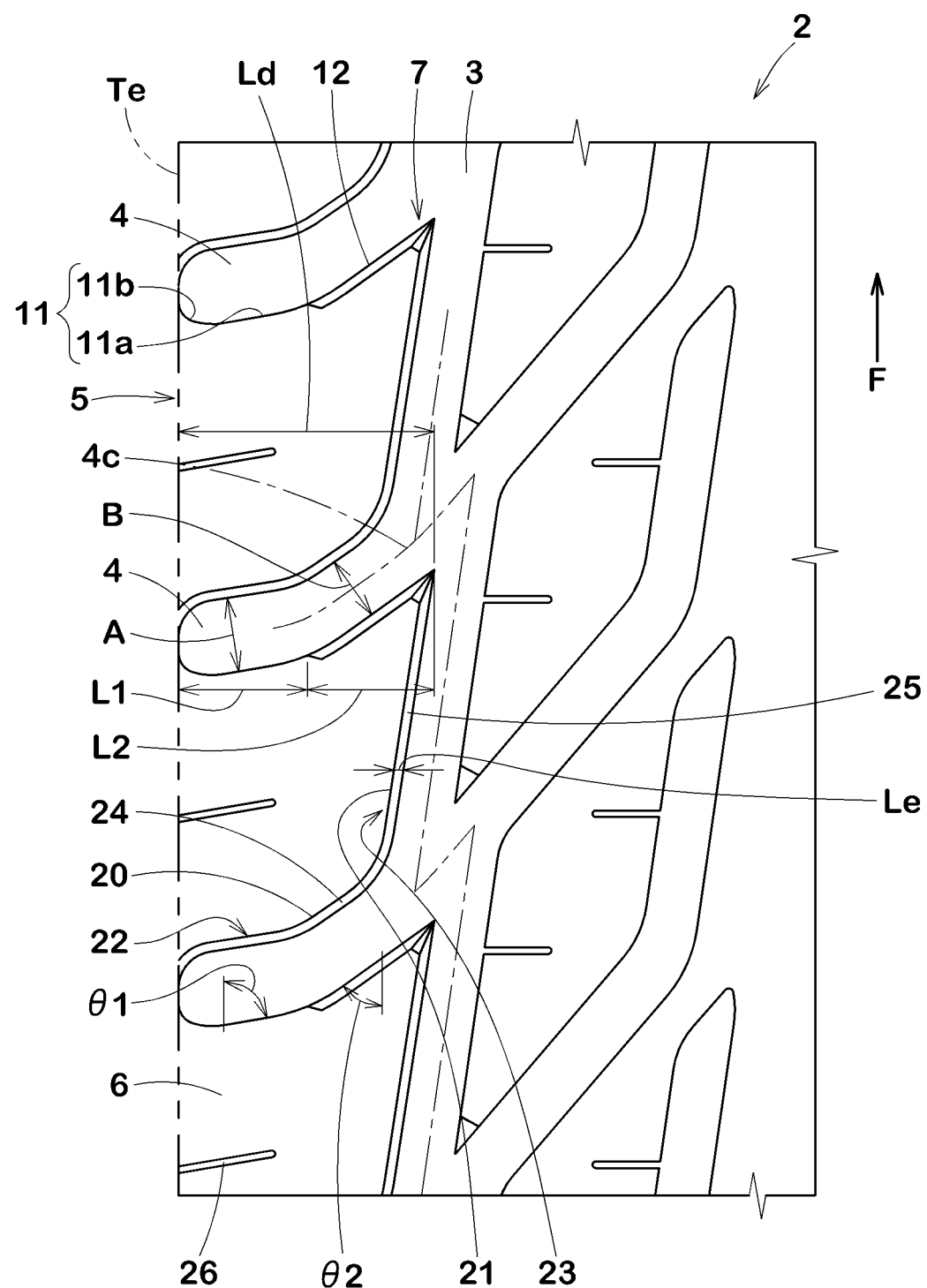
FIG. 4 is a partial plan view of the tread portion.

FIG. 4 illustrates a partial plan view of the tread portion 2. As illustrated in FIG. 4, the first portion 11 and the second portion 12 of each block 5 are connected so as to form a smooth curve without having a bend portion. Such a combination of the first portion 11 and the second portion 12 can reduce rigidity difference of the block 5 and thus enhance wet steering stability performance.

In order to further improve the above-mentioned effects, the angle θ1 of the first portion 11 with respect to the tire circumferential direction is preferably equal to or more than 45 degrees, more preferably equal to or more than 70 degrees. Also, the angle θ2 of the second portion 12 with respect to the tire circumferential direction is preferably less than 70 degrees, more preferably less than 45 degrees. More specifically, it is desirable that the first portion 11 is formed from the position where the angle θ1 is 45 degrees to the outside in the tire axial direction, and that the first portion 11 is more preferably formed from the position where the angle θ1 is 70 degrees to the outside in the tire axial direction. In the present embodiment, the first portion 11 is formed on the outside in the tire axial direction from the position where the angle θ1 is 80 degrees.

The first portion 11 according to the present embodiment includes an axially inner portion 11a which is connected to the second portion 12, and an axially outer portion 11b having a length in the tire axial direction smaller than that of the inner portion 11a and connecting the inner portion 11a with the tread edge Te. Further, the angle θ1 of the outer portion 11b is smaller than the than inner portion 11a. The outer portion 11b, for example, has an angle smaller than the angle θ2 of the second portion 12. The outer portion 11b according to the present embodiment is formed sharper than the second portion 12, and no chamfer portion is formed on the outer portion 11b.

When the groove width B at the second portion 12 is too small, hydro performance may deteriorate. When the groove width A at the first portion 11 is excessively large, rigidity in the tire circumferential direction at the first portion 11 of the block 5 may become small, and thus wet steering stability performance may deteriorate. From these viewpoints, a ratio (B/A) of the groove width B at the second portion 12 to the groove width A at the first portion 11 is preferably equal to or more than 0.50, more preferably equal to or more than 0.70. Further, the ratio (B/A) is preferably equal to or less than 0.95, more preferably equal to or less than 0.90.

In addition, the ratio (B/A) is preferably set in a range of 0.50 to 0.95 while maintaining the difference Δγ between the angle γ of the first portion 11 and the angle γ of the second portion 12 being in a range of 5 to 10 degrees. When the difference Δγ is less than 5 degrees or more than 10 degrees, water drainage cannot be performed in a well-balanced manner between the first portion 11 and the second portion 12, and thus an improvement in wet steering stability performance tends to be small.

Further, the ratio (B/A) is preferably set in a range of 0.50 to 0.95 while maintaining the chamfer width Lb of the second portion 12 being in a range of 1.0 to 10.0 mm. When the chamfer width Lb is less than 1.0 mm or more than 10.0 mm, water drainage by the second portion 12 may not be performed effectively, and thus wet steering stability performance may not be improved.

Preferably, the ratio (B/A) is a ratio of the lateral grooves 4 formed between the shoulder blocks. Thus, water in the lateral grooves 4 can be smoothly discharged from the tread edge Te so that wet steering stability performance can be effectively exhibited.

Although not particularly limited, it is preferable that a length L1 in the tire axial direction of the first portion 11 is equal to a length L2 in the tire axial direction of the second portion 12. This has the effect of improving uniformity of the ground contact pressure while improving wet steering stability performance. In order to further improve the above-mentioned effects, a ratio (L1/L2) of the length L1 of the first portion 11 to the length L2 of the second portion 12 is preferably equal to or more than 0.3, more preferably equal to or more than 0.4. Further, the ratio (L1/L2) is preferably equal to or less than 0.7, more preferably equal to or less than 0.6.

As illustrated in FIG. 2, the chamfer portion 15 of the block 5 according to the present embodiment includes a non-change part 17 where the chamfer width Lb (shown in FIG. 3) is the same along the lateral groove 4, and a change part 18 where the chamfer width Lb becomes smaller toward the first portion 11 side. Such a change part 18 can maintain excellent wet steering stability performance by reducing rigidity difference of the leading-side corner portion 10 of the block 5. In the change part 18, the chamfer height Hb according to the present embodiment becomes smaller toward the first portion 11 side.

As illustrated in FIG. 4, in the present embodiment, the block 5 further includes a second block sidewall surface 20 located on the trailing side in the rotation direction F, and a longitudinal block sidewall surface 21 formed by the main groove 3. Further, the block 5 includes a trailing-side corner portion 22 formed between the block tread surface 6 and the second block sidewall surface 20, and a main-groove side corner portion 23 formed between the block tread surface 6 and the longitudinal block sidewall surface 21.

A chamfer portion 24 is formed on the trailing-side corner portion 22. The chamfer portion 24 is formed over the entire length of the trailing-side corner portion 22, for example. In addition, a chamfer portion 25 is formed on the main-groove side corner portion 23. The chamfer portion 25 is formed over the entire length of the main-groove side corner portion 23, for example. This can improve uniformity of the ground contact pressure of the block 5. In the present embodiment, the chamfer portion 24 and the chamfer portion 25 mainly have the same shape as the chamfer portion 15. Thus, for the chamfer portion 24 and chamfer portion 25, only the parts different from the chamfer portion 15 will be explained. The chamfer portion 24 and the chamfer portion 25 are not limited to such an embodiment, but may have a different shape from the chamfer portion 15.

A chamfer width Le, which is the length in the tire axial direction of the chamfer portion 25, is preferably equal to or less than 12.5% of the length (maximum length) Ld in the tire axial direction of the block 5, more preferably equal to or less than 10.0%. The chamfer width Le of the chamfer portion 25 is preferably equal to or more than 2.5% of the length Ld in the tire axial direction of the block 5, more preferably equal to or more than 5.0%.

In each block 5 according to the present embodiment, the brock tread surface 6 is provided with at least one sipe 26 extending in the tire axial direction. In each block 5, a single sipe 26 is provided, for example. Such a sipe 26 can exert scratching effect on wet road surfaces and can enhance wet steering stability performance. As used herein, "sipe" is defined as a narrow slit having a width of less than 1.0 mm and is distinguishing from a "groove" having a groove width equal to or more than 1.0 mm.

Each sipe 26, for example, extends from the tread edge Te and terminating within each block 5. In addition, each sipe 26, in the present embodiment, is inclined toward the tread edge Te to the trailing side in the rotation direction F. Such a sipe 26 can smoothly discharge water between the block tread surface 6 and the road surface to the outside of the tread edge Te while suppressing reduction in rigidity of the block 5.

Figure 5:
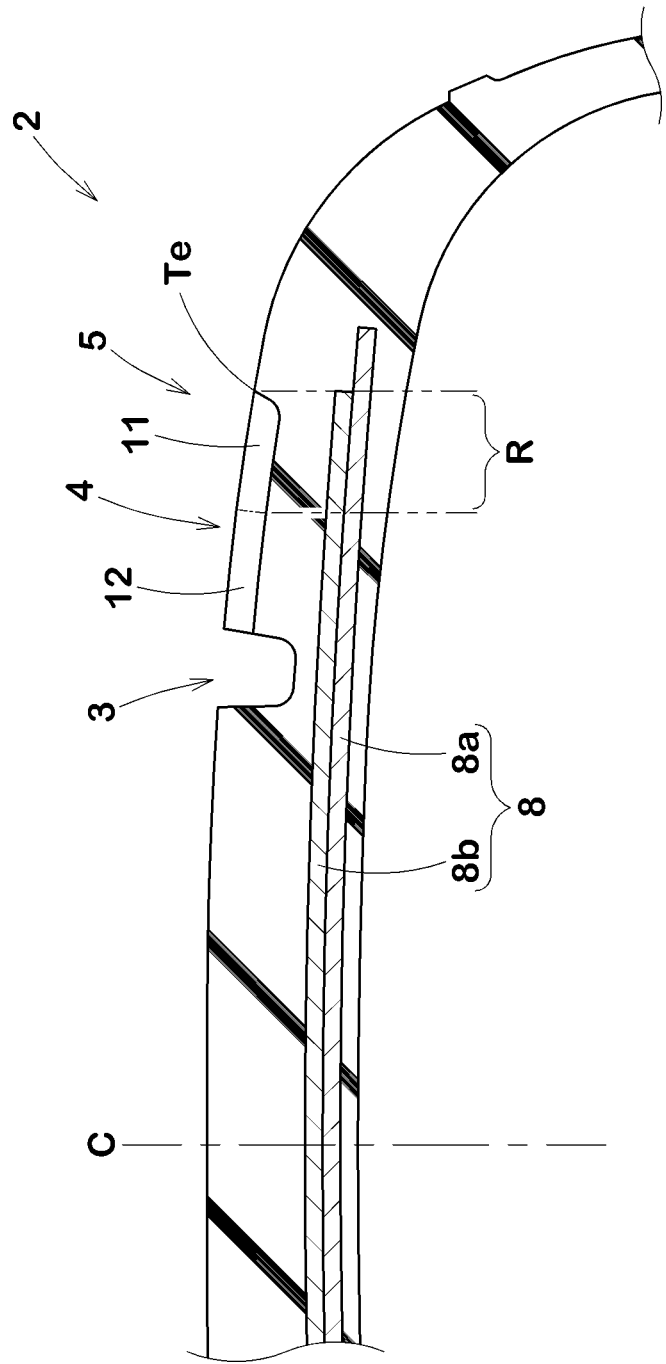
FIG. 5 is a partial cross-sectional view of the tread portion.

FIG. 5 illustrates a partial cross-sectional view of the tread portion 2. As illustrated in FIG. 5, the tread portion 2, for example, is provided with a belt layer 8 extending in the tire axial direction. The belt layer 8 according to the present embodiment includes an inner belt ply 8a having a plurality of belt cords (not illustrated) oriented in a first direction with respect to the tire axial direction, and an outer belt ply 8b disposed outwardly in the tire radial direction of the inner belt ply 8a and having a plurality of belt cords oriented in a second direction opposite the first direction with respect to the tire axial direction. The belt layer 8 according to the present embodiment is made of a well-known material.

The belt layer 8, for example, is located in an inner region R of each first portion 11 in the tire radial direction. Thus, rigidity of each block 5 is increased and ground contact pressure of each first portion 11 is increased so that hydroplaning phenomenon can be suppressed. In the present embodiment, the belt layer 8 is disposed in the entire inner region R of the first portion 11.

Figure 6:
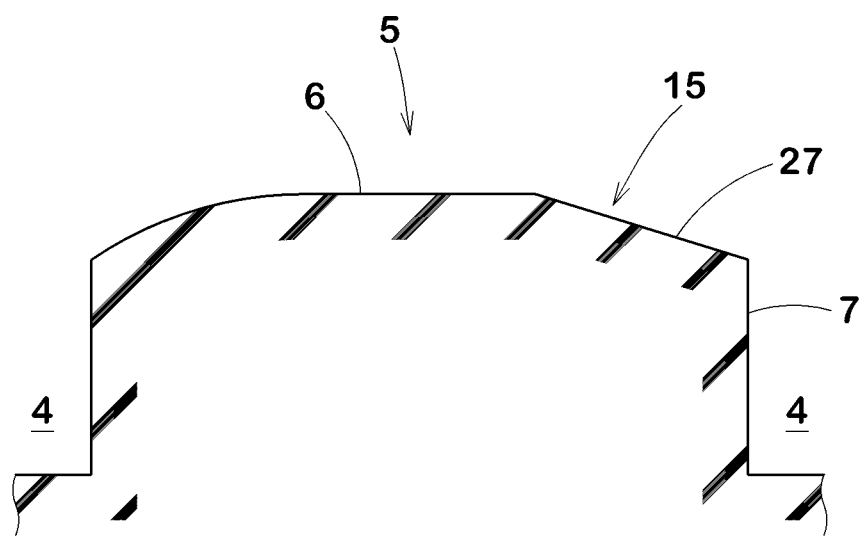
FIG. 6 is a cross-sectional view of a block in accordance with another embodiment.

FIG. 6 is a cross-sectional view of one of the blocks 5, which corresponds to a cross-sectional view taken along the line C-C of FIG. 1, in accordance with another embodiment. As illustrated in FIG. 6, the chamfer portion 15, for example, is formed by a plane 27. Note that the chamfer portion 15 may be formed by a combination of the plane 27 connected to the block tread surface 6 and a curved surface 16 which connects the plane 27 with the first block sidewall surface 7 (not illustrated).

Figure 7:
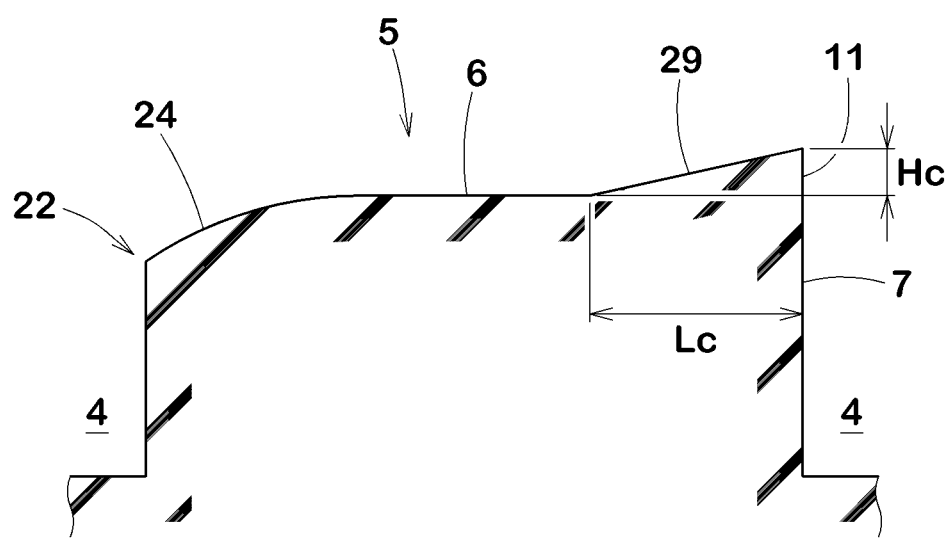
FIG. 7 is a cross-sectional view of a block in accordance with yet another embodiment.

FIG. 7 is a cross-sectional view of one of the blocks 5, which corresponds to a cross-sectional view taken along the line D-D of FIG. 2, in accordance with yet another embodiment. As illustrated in FIG. 7, the block tread surface 6 includes a periphery portion 29 connected to the first portion 11.

The periphery portion 29, for example, is inclined outwardly in the tire radial direction toward the first portion 11. Such a periphery portion 29 can increase a block height of the first portion 11 to further increase ground contact pressure of this portion, and thus further improves hydro performance of the tire.

Further, in order to enhance the above-mentioned action in a well-balanced manner, a height Hc of the periphery portion 29 is preferably equal to or less than 0.25 times a length Lc of the periphery portion 29 in the tire circumferential direction, more preferably equal to or less than 0.22 times. The height Hc of the periphery portion 29 is preferably equal to or more than 0.05 times the length Lc of the periphery portion 29, more preferably equal to or more than 0.08 times.

Although not particularly limited, the length Lc of the periphery portion 29 is preferably equal to or more than 1.0 mm, more preferably equal to or more than 2.0 mm, still further preferably equal to or more than 3.0 mm. The length Lc of the periphery portion 29 is preferably equal to or less than 10.0 mm, more preferably equal to or less than 9.0 mm, still further preferably equal to or less than 8.0 mm.

Figure 8:
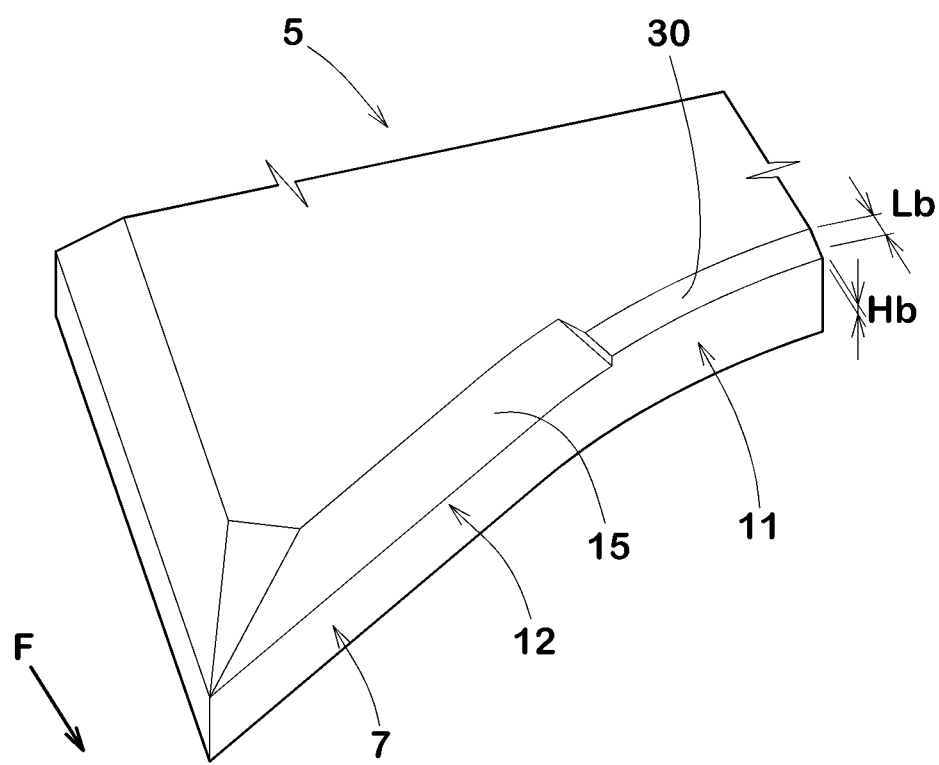
FIG. 8 is a partial perspective view of a block in accordance with yet another embodiment.

FIG. 8 illustrates a partial perspective view of one of the blocks 5 in accordance with yet another embodiment viewed from the first block sidewall surface 7 side. As illustrated in FIG. 8, in the block 5 according to this embodiment, the first portion 11 is formed by a chamfer portion 30 that is smaller in chamfer width and chamfer height than the chamfer portion 15 of the second portion 12. Such a block 5 can further improve uniformity of ground contact pressure. The chamfer portion 30 of the first portion 11 according to this embodiment is formed with the same chamfer width Lb and the same chamfer height Hb over the entire length of the first portion, for example.

Figure 9:
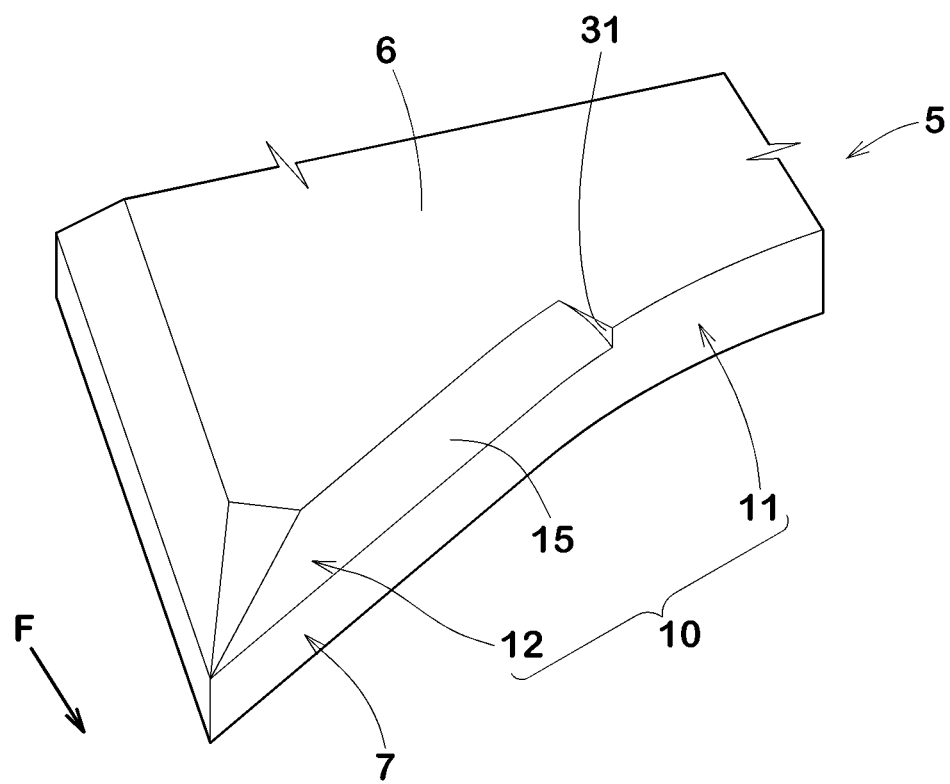
FIG. 9 is a partial perspective view of a block in accordance with yet another embodiment.

FIG. 9 illustrates a partial perspective view of one of the blocks 5 in accordance with yet another embodiment viewed from the first block sidewall surface 7 side. As illustrated in FIG. 9, in the leading-side corner portion 10 of the block 5 according to this embodiment, the first portion 11 and the chamfer portion 15 of the second portion 12 are connected by a stepped surface 31 extending in the tire radial direction. In such a leading-side corner portion 10, ground contact pressure becomes relatively high near the stepped surface 31 so that hydroplaning phenomenon can be suppressed.

Figure 10:
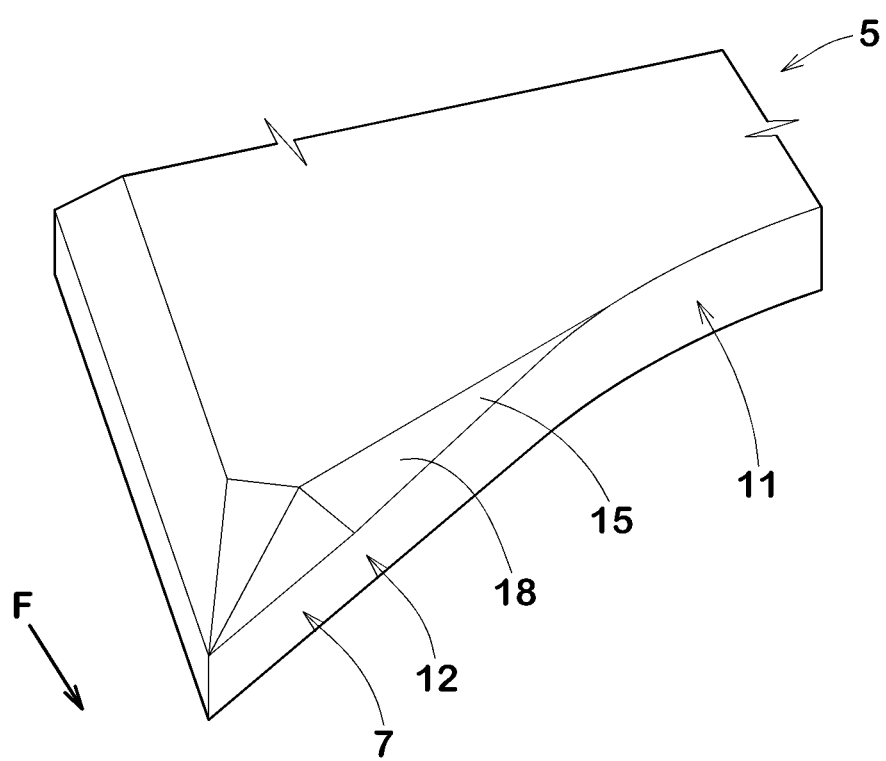
FIG. 10 is a partial perspective view of a block in accordance with yet another embodiment.

FIG. 10 illustrates a partial perspective view of one of the blocks 5 in accordance with yet another embodiment viewed from the first block sidewall surface 7 side. As illustrated in FIG. 10, in the block according to this embodiment, the chamfer portion 15 of the second portion 12 is formed by the change part 18 without having the non-change part 17.

Although the preferred embodiments of the present invention have been described in detail above, the present invention is not limited to the above-mentioned specific embodiments, but can be modified to various aspects within the scope of claims.

EXAMPLE

Pneumatic tires for passenger cars were manufactured, and then driving performance of each test tire on wet roads was tested. The test tires have the tread portion including blocks based on FIG. 1 and FIG. 2, and the shapes other than the blocks are common. The test method and common specifications of the tires are as follows.

Tire size: 235/40R18
Rim size: 18×12J
Internal pressure: 200 kPa (all wheels)
Lap Time and Steering Stability Performance Test:

A test driver drove a test vehicle equipped with test tires as fast as possible on a circuit test course whose asphalt surface is covered with water of 5 mm deep. Then, the difference (T−Tn) between a reference time T, which is the lap time (running time) when reference test tires are equipped (reference example), and respective lap times Tn when the comparative example tires or the example tires are equipped was calculated. The lap time result is indicated using an index with the difference Δt between the lap times of Comparative example 1 and the reference example as 100. In addition, steering stability performance was evaluated by the test driver by sensuality, taking into account the lap time. The steering stability performance results are shown by score with the tire of the reference example as 100. The larger the value, the better the test results. The test vehicle was a racing car for Group GT3 (auto racing).

The followings are notes about Tables.

"A" in Table 1 represents that the first portion (a sharper corner) without chamfer portion is formed on a region of each leading-side corner portion where the angle with respect to the tire circumferential direction is closest to 90 degrees and a region adjacent to it.

"B" represents that each leading-side corner portion is chamfered entirely.

"C" represents that each leading-side corner portion is not chamfered (an aspect of the entire region being sharper).

"D" represents that each leading-side corner portion includes the first portion where no chamfer portion is formed and the second portion where the chamfer portion is formed.

"E" represents that each second portion is sharper than each first portion.

"Angle of first portion" means that each first portion is formed outwardly of a location of the angle thereof with respect to the tire circumferential direction described in each example.

In Table 3, the chamfer portions of examples are smoothly connected to the block tread surfaces, and the chamfer portions of comparative examples are not smoothly connected to the block tread surfaces.

The groove widths B are the same size in both examples and comparative examples.

Tables 1 to 5 show the test results.

TABLE 1

|  | Ref. Ex. | Com. Ex. 1 | Ex. 1 | Com. Ex. 2 | Com. Ex. 3 | Com. Ex. 4 | Com. Ex. 5 | Ex. 2 | Ex. 3 | Ex. 4 | Ex. 5 |
|---|---|---|---|---|---|---|---|---|---|---|---|
| Chamfer portion location | — | the whole | A | A | A | A | A | A | A | A | A |
| Number of trailing-side sidewall surfaces | 2 | 2 | 2 | 5 | 2 | 2 | 2 | 5 | 2 | 2 | 2 |
| Angle $\theta_1$ of first portion (deg.) | — | — | 80 | 80 | 30 | 90 | 70 | 80 | 30 | 90 | 70 |
| Trailing-side corner portion shape | C | B | D | E | E | E | D | D | D | D | D |
| Groove width ratio (B/A) | 0.80 | 0.80 | 0.80 | 0.80 | 0.80 | 0.80 | 1.00 | 0.80 | 0.80 | 0.80 | 1.00 |
| Angle difference $\Delta\gamma$ between first portion and second portion (deg.) | — | — | 8 | 8 | 8 | 8 | 8 | 3 | 5 | 10 | 12 |
| Driving performance on wet road |  |  |  |  |  |  |  |  |  |  |  |
| Lap time [index: Larger is better] | — | 105 | 112 | 105 | 104 | 106 | 105 | 108 | 110 | 113 | 113 |
| Steering stability [score: Larger is better] | 100 | 102 | 108 | 104 | 102 | 103 | 103 | 110 | 110 | 106 | 103 |

TABLE 2

|  | Ex. 6 | Ex. 7 | Ex. 8 | Ex. 9 | Ex. 10 | Ex. 11 | Ex. 12 |
|---|---|---|---|---|---|---|---|
| Chamfer portion location | A | A | A | A | A | A | A |
| Number of trailing-side sidewall surfaces | 2 | 2 | 2 | 2 | 2 | 2 | 2 |
| Angle $\theta_1$ of first portion (deg.) | 70 | 60 | 50 | 50 | 50 | 50 | 50 |
| Trailing-side corner portion shape | D | D | D | D | D | D | D |
| Groove width ratio (B/A) | 0.80 | 0.80 | 0.80 | 0.95 | 0.70 | 0.50 | 0.40 |
| Driving performance on wet road |  |  |  |  |  |  |  |
| Lap time [index: Larger is better] | 110 | 112 | 110 | 108 | 110 | 110 | 108 |
| Steering stability [score: Larger is better] | 108 | 106 | 106 | 106 | 108 | 108 | 108 |

TABLE 3

|  | Reference Example | Ex. 1 | Comp. Ex. 6 | Comp. Ex. 7 | Comp. Ex. 8 | Ex. 13 | Ex. 14 |
|---|---|---|---|---|---|---|---|
| Relation between $\theta_1$ and $\theta_2$ | — | $\theta_1 > \theta_2$ | — | — | — | $\theta_1 > \theta_2$ | $\theta_1 > \theta_2$ |
| Chamfer portion location | — | A | the whole | the whole | the whole | A | A |
| Trailing-side corner portion shape | — | D | B | B | B | D | D |
| Groove width ratio (B/A) | 0.80 | 0.80 | 0.80 | 0.80 | 0.80 | 0.80 | 0.80 |
| Lb (mm) | — | 5 | 20 | 0.5 | 5 | 10 | 10 |
| Hb/Lb | — | 0.1 | 0.5 | 0.2 | 0.3 | 0.1 | 0.3 |

TABLE 3-continued

|  | Reference Example | Ex. 1 | Comp. Ex. 6 | Comp. Ex. 7 | Comp. Ex. 8 | Ex. 13 | Ex. 14 |
|---|---|---|---|---|---|---|---|
| Driving performance on wet road | | | | | | | |
| Lap time [index: Larger is better] | — | 112 | 104 | 101 | 99 | 112 | 110 |
| Steering stability [score: Larger is better] | 100 | 110 | 105 | 100 | 95 | 108 | 108 |

TABLE 4

|  | Ex. 15 | Ex. 16 | Ex. 17 | Ex. 18 | Ex. 19 | Ex. 20 | Ex. 21 |
|---|---|---|---|---|---|---|---|
| Relation between θ1 and θ2 | θ1 > θ2 | θ1 > θ2 | θ1 > θ2 | θ1 > θ2 | θ1 > θ2 | θ1 > θ2 | θ1 > θ2 |
| Chamfer portion location | A | A | A | A | A | A | A |
| Trailing-side corner portion shape | D | D | D | D | D | D | D |
| Groove width ratio (B/A) | 0.80 | 0.80 | 0.80 | 0.45 | 0.50 | 0.95 | 0.97 |
| Lb (mm) | 12 | 1 | 1 | 5 | 5 | 5 | 5 |
| Hb/Lb | 0.2 | 0.2 | 0.2 | 0.1 | 0.1 | 0.1 | 0.1 |
| Driving performance on wet road | | | | | | | |
| Lap time [index: Larger is better] | 108 | 110 | 110 | 112 | 112 | 110 | 108 |
| Steering stability [score: Larger is better] | 110 | 110 | 108 | 106 | 108 | 110 | 110 |

TABLE 5

|  | Reference Example | Ex. 22 | Ex. 23 | Ex. 24 | Ex. 25 | Ex. 26 | Ex. 27 | Ex. 28 | Ex. 29 |
|---|---|---|---|---|---|---|---|---|---|
| Relation between θ1 and θ2 | — | θ1 > θ2 | θ1 > θ2 | θ1 > θ2 | θ1 > θ2 | θ1 > θ2 | θ1 > θ2 | θ1 > θ2 | θ1 > θ2 |
| Chamfer portion location | — | A | A | A | A | A | A | A | A |
| Trailing-side corner portion shape | — | D | D | D | D | D | D | D | D |
| Groove width ratio (B/A) | 0.80 | 0.80 | 0.80 | 0.80 | 0.80 | 0.80 | 0.80 | 0.80 | 0.80 |
| Lc (mm) | — | 5 | 5 | 0.5 | 20 | 10 | 10 | 12 | 8 |
| Hc/Lc | — | 0.2 | 0.6 | 0.2 | 0.2 | 0.1 | 0.3 | 0.2 | 0.2 |
| Driving performance on wet road | | | | | | | | | |
| Lap time [index: Larger is better] | — | 116 | 112 | 110 | 108 | 114 | 114 | 112 | 114 |
| Steering stability [score: Larger is better] | 100 | 115 | 113 | 110 | 112 | 110 | 108 | 110 | 112 |

As a result of the tests, it was confirmed that the tires of examples had excellent wet steering stability performance.

What is claimed is:

1. A tire comprising:
a tread portion having a designated rotation direction, the tread portion comprising at least one block row comprising a plurality of blocks arranged in a tire circumferential direction and a plurality of lateral grooves arranged between the plurality of blocks,
each of the plurality of blocks comprising a block tread surface, a first block sidewall surface located on a leading side in the rotation direction of the block, and a leading-side corner portion between the block tread surface and the first block sidewall surface,
wherein
the leading-side corner portion comprises a first portion and a second portion each extending in a tire axial direction,
the first portion is smaller in angle (γ) than the second portion, where the angle (γ) is an angle between a normal (n) of the block tread surface and a virtual straight-line (m) in which the block sidewall surface connected to the block tread surface is expanded outwardly in a tire radial direction,
a chamfer portion is formed on the first portion,
a chamfer portion is formed on the second portion,
the chamfer portion of the first portion is smaller in chamfer width and chamfer height than the chamfer portion of the second portion,
in a plan view of each block, an angle θ1 of the chamfer portion of the first portion with respect to the tire circumferential direction is larger than an angle θ2 of the chamfer portion of the second portion with respect to the tire circumferential direction, and each lateral groove has a groove width (A) at the first portion that is larger than a groove width (B) at the second portion.

2. The tire according to claim 1, wherein the angle θ1 of the chamfer portion of the first portion with respect to the tire circumferential direction is equal to or more than 45 degrees.

3. The tire according to claim 2, wherein the angle θ1 of the chamfer portion of the first portion with respect to the tire circumferential direction is equal to or more than 70 degrees.

4. The tire according to claim 2, wherein a ratio (B/A) of the groove width (B) at the second portion to the groove width (A) at the first portion is in a range of 0.50 to 0.95.

5. The tire according to claim 1, wherein a ratio (B/A) of the groove width (B) at the second portion to the groove width (A) at the first portion is in a range of 0.50 to 0.95.

6. The tire according to claim 1, wherein
a chamfer width, which is a length of the chamfer portion in the tire circumferential direction, of the chamfer portion of the second portion is in a range of 1.0 to 10.0 mm.

7. The tire according to claim 1, wherein
the chamfer portion of the second portion is formed by a curved surface that is convex outward in a tire radial direction.

8. The tire according to claim 1, wherein
the chamfer portion of the second portion is formed by a plane.

9. The tire according to claim 1, wherein
the block tread surface comprises a periphery portion connected to the first portion, and
the periphery portion is inclined outwardly in a tire radial direction toward the first portion.

10. The tire according to claim 1, wherein
the plurality of blocks is a plurality of shoulder blocks that includes a tread edge, and
each first portion of the plurality of shoulder blocks is arranged on the tread edge side with respect to a respective one of the second portions of the plurality of shoulder blocks.

11. The tire according to claim 1, wherein
each of the plurality of blocks comprises a second block sidewall surface located on a trailing side in the rotation direction of the block, and a trailing-side corner portion between the block tread surface and the second block sidewall surface, and
a chamfer portion is formed on the trailing-side corner portion.

12. The tire according to claim 1, wherein
the tread portion is provided with a main groove extending in the tire circumferential direction, and
each second portion is in communication with the main groove.

13. The tire according to claim 12, wherein
each of the plurality of blocks comprises a longitudinal block sidewall surface formed by the main groove, and a main-groove side corner portion between the block tread surface and the longitudinal block sidewall surface, and
a chamfer portion is formed on the main-groove side corner portion.

14. The tire according to claim 1, further comprising a belt layer disposed in the tread portion, wherein
the belt layer comprises an inner belt ply having a plurality of belt cords oriented in a first direction with respect to the tire axial direction, and an outer belt ply disposed outwardly in a tire radial direction of the inner belt ply and having a plurality of belt cords oriented in a second direction opposite the first direction with respect to the tire axial direction, and
the belt layer is located in an inner region of each first portion in the tire radial direction.

15. A tire comprising:
a tread portion having a designated rotation direction, the tread portion comprising at least one block row comprising a plurality of blocks arranged in a tire circumferential direction and a plurality of lateral grooves arranged between the plurality of blocks,
each of the plurality of blocks comprising a block tread surface, a first block sidewall surface located on a leading side in the rotation direction of the block, and a leading-side corner portion between the block tread surface and the first block sidewall surface,
wherein
the leading-side corner portion comprises a first portion and a second portion each extending in a tire axial direction,
the first portion is smaller in angle (γ) than the second portion, where the angle (γ) is an angle between a normal (n) of the block tread surface and a virtual straight-line (m) in which the block sidewall surface connected to the block tread surface is expanded outwardly in a tire radial direction,
a chamfer portion is formed on the first portion such that the chamfer portion extends across all of the first portion,
a chamfer portion is formed on the second portion,
the chamfer portion of the first portion is smaller in chamfer width and chamfer height than the chamfer portion of the second portion,
in a plan view of each block, an angle θ1 of the first portion with respect to the tire circumferential direction is larger than an angle θ2 of the second portion with respect to the tire circumferential direction, and
each lateral groove has a groove width (A) at the first portion that is larger than a groove width (B) at the second portion.

* * * * *